W. W. DICKINSON, Jr.

BRICK HANDLING APPARATUS.

APPLICATION FILED OCT. 17, 1917.

Reissued Feb. 19, 1918.

14,433.

2 SHEETS—SHEET 1.

Inventor

William W. Dickinson, Jr.,

By Hall, Smith, Brock & West

Attys

W. W. DICKINSON, Jr.

BRICK HANDLING APPARATUS.

APPLICATION FILED OCT. 17, 1917.

Reissued Feb. 19, 1918.

14,433.

2 SHEETS—SHEET 2.

Inventor

William W. Dickinson, Jr.,

By Hull, Smith, Brock & Hart

Attys.

UNITED STATES PATENT OFFICE.

WILLIAM WALLACE DICKINSON, JR., OF LITTLE ROCK, ARKANSAS.

BRICK-HANDLING APPARATUS.

14,433. Specification of Reissued Letters Patent. Reissued Feb. 19, 1918.

Original application filed March 13, 1916, Serial No. 83,931. Patent No. 1,197,354, dated September 5, 1916. Divided and application filed June 1, 1916, Serial No. 101,048. Original No. 1,197,355, dated September 5, 1916. Application for reissue filed October 17, 1917. Serial No. 197,132.

*To all whom it may concern:*

Be it known that I, WILLIAM W. DICKINSON, JR., a citizen of the United States, and a resident of Little Rock, in the county of Pulaski and State of Arkansas, have invented certain new and useful Improvements in Brick-Handling Apparatus, of which the following is a specification.

My present invention relates generally to brick handling apparatus, for depositing brick into, and removing the same from, kilns, before and after the burning thereof, and more particularly to a suspended carrier of the type shown in my Patent No. 1,197,354, granted September 5, 1916, of which these presents are a division.

My object in the present improvement is to provide a simple and effective brick carrier having means whereby to support and carry either dried or undried, burned or unburned brick, either in a single course or a plurality of courses, without clamping engagement therewith and without otherwise endangering crushing or breaking the brick in the then comparatively fragile state.

A further object is to provide a brick carrier having load discharging means of such nature as to permit depositing the load directly over the space over which the carrier is spotted in its discharging operation, and this without breaking, deforming, crushing, or mutilating the bricks and without disturbing the arrangement of the pile when a considerable number of courses are handled simultaneously.

Figure 1:
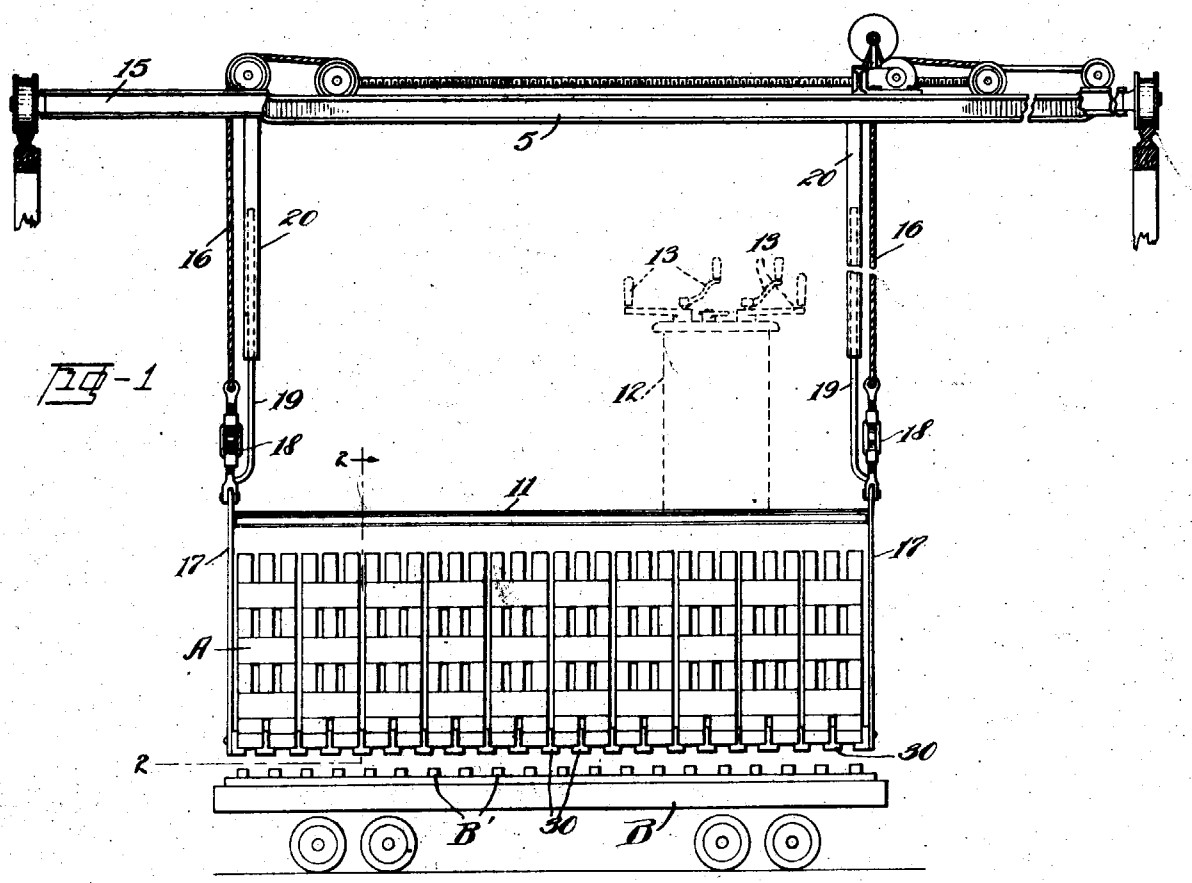
Figures 2, 3:
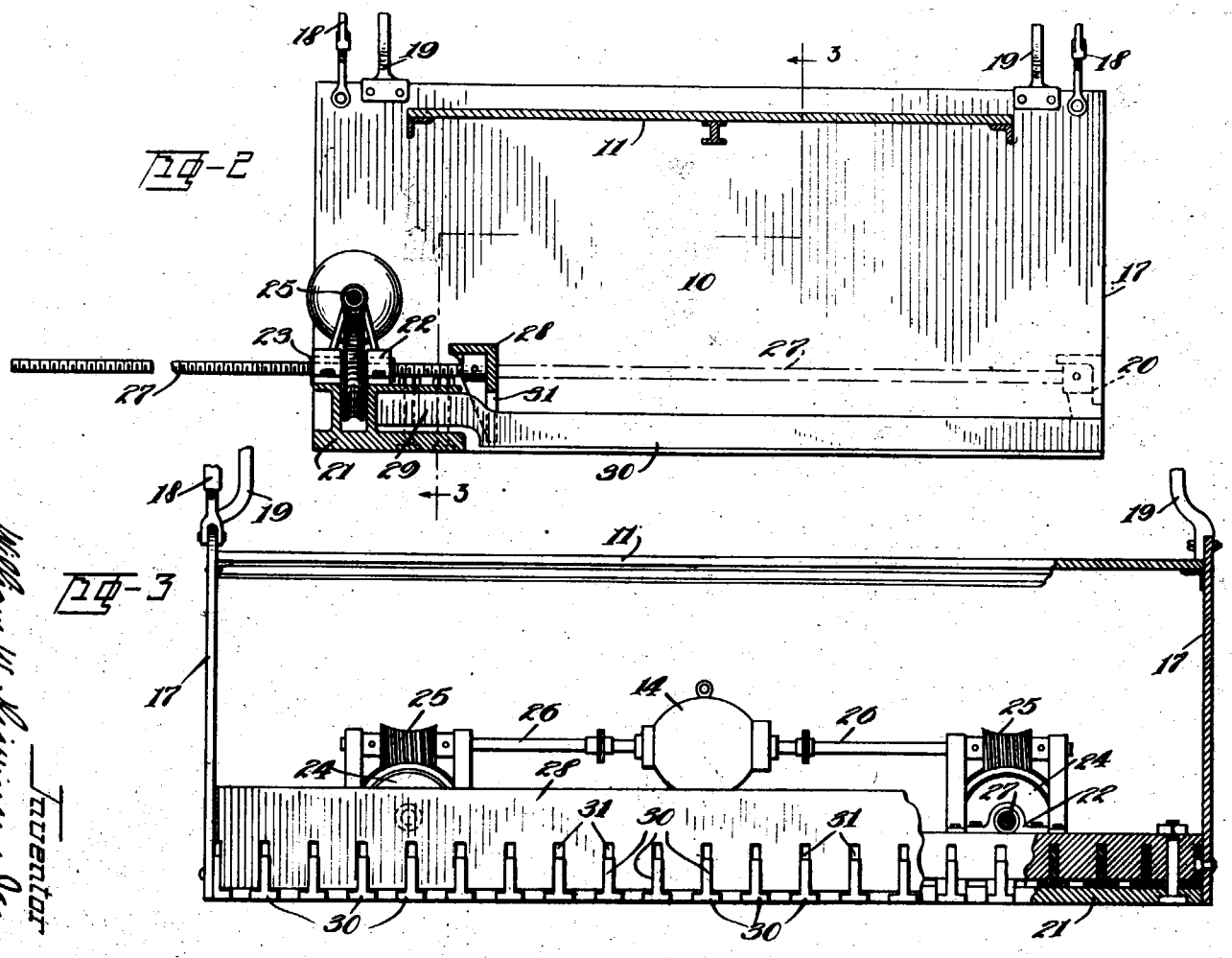

In the accompanying drawings illustrating my invention, Figure 1 is a front elevation, partly broken away, illustrating the practical use of my improvement in picking up or setting down a load or hack made up of several courses of brick. Fig. 2 is a vertical sectional view taken substantially on line 2—2 of Fig. 1, through the suspended carrier, and Fig. 3 is an enlarged front view of the carrier, partly broken away and in section along line 3—3 of Fig. 2.

Referring now to these figures, my improved carrier, generally indicated at 10, has an upper platform 11 constituting the top thereof and on which may be disposed an operator's control box 12 as indicated in dotted lines in Fig. 1, having various controlling handles 13, controlling both the operation of the discharging motor of the carrier as seen at 14 in Fig. 3 and also the operation of the traveling super-structure 15 as indicated in Fig. 1 and described and claimed in my co-pending application above mentioned, and from which super-structure my improved carrier is suspended by means of cables 16 connected to the upper forward and rear portions of the carrier sides 17 by means of turn buckles 18, the carrier being guided by means of rigid uprights 19 which telescope into depending rigid guide tubes 20 connected to the super-structure 15 and thus permit of raising and lowering the carrier as a whole.

Across the lower rear portions of the carrier 10, between the sides 17 thereof, is a casting 21 having supporting bearings 22, as seen in Fig. 3, for tubular adjusting nuts 23, see Fig. 2, having worm wheels 24 in connection therewith and in mesh with worms 25 adjacent the opposite ends of the motor shaft 26, the motor 14 for actuating, as hereinbefore referred to, being also mounted upon the casting 21. Through the tubular nuts 23, carrying the worm wheels 24 are extended screw bars 27 rigidly connected at their forward ends to a transversely extending push bar 28.

To the casting 21 are also connected the rear upwardly offset ends 29 of forwardly projecting pick up fingers 30, arranged in a spaced parallel series, as best seen by reference to Figs. 1 and 3, with their lower faces flush with the lower edges of the sides 17 of the carrier and the lower face of the rear casting 21, the series of pick up fingers so formed constituting substantially the supporting base of the carrier, for the purpose to be hereinafter described, it being noted particularly from Fig. 3 that each of the fingers 30 is of inverted T-shape, its upstanding web portion projecting through a conformably-shaped slot 31 in the push bar 28, and of which there are a series corresponding to the numbers of the pick up fingers.

As thus constructed, the carrier is adapted for movement with the super-structure 15 beneath a load of dried unburnt brick, as indicated at A in Fig. 1, laid by templets upon a drying car, as seen at B, in the same figure, the supporting surface of which has crossed spacing strips B′ of sufficient height to enable the lower flanged portion of the pick up fingers 30 to be projected beneath the stack of bricks, the upstanding webs of the fingers extending into spaces between the bricks which remain therebetween during the drying operation, to permit of free circulation of air through the stacks.

It is, of course, understood, at the time the pick up of the stack is made, the push bar 28 is retracted to its rearmost position, as shown in full lines in Fig. 2. The carrier is then moved and elevated by super-structure 15, so as to proceed into the kiln above the level of the top of the stack of bricks therein, it being understood that the kiln receives many stacks in superposed relation of the size shown in Fig. 1, upon the drying car B. When within the kiln, the carrier may be spotted directly over either the space where the stack within the kiln is to be started, or over the partially completed stack, and then, by starting the motor 14 from the operator's station upon platform 11, the push bar 28 is adjusted forwardly, until the stack is entirely discharged from the carrier, at which time the push bar 28 is substantially in the position shown in dotted lines in Fig. 2. By this arrangement the bricks may be readily removed in stacks from the kiln after being burned, and readily and quickly stacked at any particular storage space outside of the kiln over which the carrier may be spotted. Furthermore, by the particular arrangement of the pick up fingers, a considerable number of bearing points beneath the entire stack results, so as to support the stack conveniently in proper position and coöperate with the sides of the carrier in preventing ready displacement. The same structure additionally obviates the provision of means clamping or otherwise engaging the bricks and endangering crushing or breaking the latter.

The webs of the fingers have a thickness not greater than the width of the space customarily left between adjacent bricks as the same are arranged in a burning kiln, and the depth of these webs depends upon the strength required for the manipulation of the load intended. Inasmuch as the fingers are secured only at one end this web is the sole reliance for supporting the load, and if, by reason of the size of loads intended, the webs be made of greater depth than the dimensions of a single brick, it is possible to lay the first course of a double row of bricks (see Fig. 1) before commencing the breaking of joints. Also the arrangement of the bricks will depend upon the choice of the user, since my apparatus will receive them endwise, sidewise, edgewise, flatwise, or any other way.

The flanges of these fingers, constituting the arms of the T section, are arranged at the very bottom of the webs and constitute the sole support for the bricks. This construction is important for two reasons: first, because it presents a minimum of friction to the sliding of the bricks thereover; and, second, because it brings the bottom of the load so near the bottom of the carrier that when the latter is moved into discharging position and lowered close to the receiving surface the load can be deposited without such jar as to break or crush the bricks or disarrange their piled formation even though they be not burned. If the entire mass of the fingers were located beneath the load, the bricks might be raised so high that this could not be done.

The distance between successive webs is slightly greater than the corresponding dimension of the bricks that are to be handled, since the bricks will not slide if frictionally gripped endwise. The slotted formation of the push bar provides a guiding connection for the same, in addition to which the two ends of the same are always advanced and retracted simultaneously, thus preventing the bricks from jamming or rubbing against the webs.

The bricks may either be delivered directly upon these fingers in the first instance (either manually or automatically) or they may be piled by templets upon a receiving surface provided with spacing strips of such size and arrangement that the pick up fingers can be introduced beneath the pile after its completion. This pile can then be deposited unbroken upon a smooth surface or upon the top of a previous pile of bricks in a drying kiln, burning kiln, storage yard, boat or railway car, or it can be deposited upon a surface previously prepared in some way, as by spacing strips or rows of bricks, to support the pile in such fashion as to enable it to be recovered subsequently by another apparatus of the same or a different type. Such spacing strips are not necessary to the successful deposition of the load but only to its subsequent removal.

It will also be understood that the unloading operation of the device can either be considered as a shoving of the bricks off the carrier or as a withdrawing of the carrier from beneath the bricks; for the forward pressure of the push bar against the bricks is exactly equaled by its reaction against the carrier and while the movement of the bricks relatively to the carrier will be the same in all cases, their movement relatively to the ground will vary with circumstances. If, for example the partly filled carrier were brought immediately adjacent a previously deposited stack of bricks and the pusher operated, the first result would ordinarily be to move the bricks relatively to the ground, the carrier meanwhile remaining at rest; then as soon as the bricks on the carrier either touched the previous pile or engaged the ground the resistance so produced would stop the movement of the bricks and necessitate a movement of the carrier. This application contemplates and is intended to include both aspects and no language contained therein is to be considered as a limitation to either.

The height of the pile which will be taken up and transported at one time depends upon the size and strength of the apparatus and the condition of the bricks. Thus if the bricks were fresh from the machine and not dried at all, a single layer might constitute a load; if the bricks were dried but not burned, six or eight courses might be considered sufficient; while after burning the number of courses would be limited only by the size and strength of the apparatus.

It will be understood that I do not restrict myself to a use of my improved brick carrier in connection with a crane or conveyer the type shown since any suitable supporting mechanism may be used; I do not restrict myself to the use of any stated number or width of fingers, or to any one arrangement of bricks or to any specific design of push-out member, or to any specific type of ejecting mechanism; in fact certain of my claims are not restricted to the use of separate fingers, other essential conditions being fulfilled; the size, shape, design, and arrangement of parts may be varied according to the demands of the particular installation; and all such changes as fall within the terms or spirit of the appended claims I hold as my invention.

Having thus described my invention, what I claim is:—

1. A brick carrier having a series of spaced, parallel, horizontal, carrying fingers supported at one end, each of said fingers consisting of a vertical web having at its lower margin a laterally projecting immovable flange, said webs being spaced apart a sufficient distance to receive a brick loosely therebetween, and adjacent flanges underlying the lateral margins of such brick in supporting relation.

2. A brick carrier having a series of spaced, parallel, horizontal, load carrying fingers, supported at one end and having their opposite ends free, each of said fingers consisting of a vertical web having at its lower edge an immovable flange projecting laterally toward the similar flange of the adjacent finger, the distance between adjacent webs being greater, and the distance between adjacent flanges being less, than the rectangular dimension of the bricks to be handled thereby.

3. In a brick carrier, in combination, a substantially horizontal platform having a groove extending to one margin of said platform and adapted for the reception of a single file of bricks, means for transporting said platform, and a pusher member movable longitudinally of said groove and adapted to eject the bricks therefrom.

4. A brick carrier having a plurality of parallel grooves, each adapted for the reception of a single file of bricks, and a pusher member located in each groove and movable longitudinally therealong to eject the bricks therefrom, all of said members being associated together for simultaneous movement whereby the bricks in the different grooves are ejected simultaneously.

5. In a brick carrier, in combination, a substantially horizontal platform formed with a groove adapted for the reception of a single file of bricks, said groove extending to one margin of said platform, and the bottom of said groove being slotted throughout its entire length, means for transporting said platform from point to point while maintaining it substantially horizontal, and a pusher member movable longitudinally along said groove whereby the bricks may be ejected from said platform.

6. A brick carrier having a series of spaced, parallel, horizontal, fingers supported at one end and having their opposite ends free, each of said fingers having a vertical web spaced from the web of the adjacent finger a distance to permit the reception of a brick therebetween and the lower margin of each web having a horizontal flange projecting toward the opposite flange a distance sufficient to receive and support the edge of such brick, in combination with a push bar extending transversely of and movable longitudinally along said fingers for ejecting the bricks therefrom.

7. A brick carrier having a series of spaced, parallel, horizontal fingers supported at one end and having their opposite ends free, each of said fingers having a vertical web spaced from the web of the adjacent finger a distance to permit the reception of a brick therebetween and the lower margin of each web having a horizontal flange projecting toward the opposite flange a distance sufficient to receive and support the edge of such brick, in combination with a push bar extending transversely of and movable longitudinally along said fingers for ejecting the bricks therefrom, and power actuated connections attached to said carrier for moving said push bar and fingers relatively to each other.

8. A brick carrier having a series of spaced, parallel, horizontal, fingers supported at one end and having their opposite ends free, each of said fingers having a vertical web spaced from the web of the adjacent finger a distance to permit the reception of a brick therebetween and the lower margin of each web having a horizontal flange projecting toward the opposite flange a distance sufficient to receive and support the edge of such brick, in combination with a push bar extending transversely of and movable longitudinally along said fingers for ejecting the bricks therefrom, said push bar being provided with a plurality of slotted openings through which the said webs extend.

9. A brick carrier having a series of spaced, parallel, horizontal fingers supported at one end and having their opposite ends free, each of said fingers having a vertical web spaced from the web of the adjacent finger a distance to permit the reception of a brick therebetween and the lower margin of each web having a horizontal flange projecting toward the opposite flange a distance sufficient to receive and support the edge of such brick, in combination with a push bar extending transversely of and movable longitudinally along said fingers for ejecting the bricks therefrom, means for moving the two ends of said push bar along said fingers at equal speed, and means for guiding said push bar in its movement.

10. In a brick carrier, in combination, a substantially horizontal receiving part adapted for the reception of a stack of bricks piled in regular courses, an ejecting part movable with respect to said receiving part adapted to push said bricks therefrom, and means for moving said parts in opposite horizontal directions whereby said bricks may be discharged from said first part, the distance between the bottom of said carrier and the bottom of the lowest course of bricks at the discharging point being less than the thickness of a brick, whereby such discharge may be effected without disarranging the piled relation of the bricks.

11. In a brick carrier, a part adapted to receive rows of brick surmounted by additional courses of brick forming a regular pile, means supporting said receiving part in substantially horizontal position, such receiving part being fashioned to permit such rows of brick to be slid thereover and the distance between the bottom of said receiving part and the surface upon which said bricks slide being small compared with the thickness of a brick at the discharge edge of said receiving part, in combination with mechanism mounted on said carrier and operative to slide said rows of brick uniformly over said discharge edge whereby the entire pile of bricks may be removed bodily and without disarranging its piled formation.

12. In a brick carrier, a receiving part adapted for the reception of regularly piled brick, power operated ejecting mechanism located on said carrier and adapted to discharge the bricks therefrom without disarranging their piled relation, and an operator's platform attached to and movable with said receiving part.

13. In a brick carrier, a series of spaced, parallel, load-carrying fingers, a push bar extending transversely of and movable along said fingers, a plurality of rigid, toothed members secured to said push bar and projecting rearwardly therefrom, actuating members engaging said toothed members, and means for operating said actuating members simultaneously whereby said push bar may be advanced or retracted.

14. In a brick handling apparatus, a brick carrier having a series of spaced parallel pick up fingers forming the supporting base thereof, supporting sides at opposite sides of the series of pick up fingers, and an operator's platform connecting the upper portions of the said sides for the purpose described.

15. In a brick handling apparatus, a brick carrier having a series of spaced parallel pick up fingers forming the supporting base thereof, a push bar extending transversely thereof and movable along said fingers, means for moving said push bar along said fingers, including screw bars rigidly connected to the said push bar, tubular adjusting members threaded on said screw bars and held against longitudinal movement, and a driven shaft gearedly connected to said adjusting members.

WILLIAM WALLACE DICKINSON, JR.